(12) United States Patent
Mercier et al.

(10) Patent No.: US 11,334,105 B2
(45) Date of Patent: May 17, 2022

(54) STABILIZED VOLTAGE AND CURRENT REFERENCE GENERATOR AND CIRCUITS

(71) Applicant: The Regents of the University of California, Oakland, CA (US)

(72) Inventors: Patrick Mercier, San Diego, CA (US); Hui Wang, La Jolla, CA (US)

(73) Assignee: The Regents of the Unversity of California, Oakland, CA (US)

( * ) Notice: Subject to any disclaimer, the term of this patent is extended or adjusted under 35 U.S.C. 154(b) by 176 days.

(21) Appl. No.: 16/099,400

(22) PCT Filed: May 18, 2017

(86) PCT No.: PCT/US2017/033429
§ 371 (c)(1),
(2) Date: Nov. 6, 2018

(87) PCT Pub. No.: WO2017/201353
PCT Pub. Date: Nov. 23, 2017

(65) Prior Publication Data
US 2019/0101947 A1    Apr. 4, 2019

Related U.S. Application Data (60) Provisional application No. 62/338,262, filed on May 18, 2016.

(51) Int. Cl.
*G05F 3/26* (2006.01)
*G01K 7/01* (2006.01)
*G05F 3/24* (2006.01)

(52) U.S. Cl.
CPC .............. *G05F 3/262* (2013.01); *G01K 7/01* (2013.01); *G05F 3/24* (2013.01)

(58) Field of Classification Search
CPC ... G05F 3/24; G05F 3/26; G05F 3/262; G05F 3/267; G05F 3/34
See application file for complete search history.

(56) References Cited

U.S. PATENT DOCUMENTS 4,165,642 A    8/1979  Lipp
6,700,363 B2*  3/2004  Tachimori .............. G05F 3/242
                                                        323/313

(Continued)

FOREIGN PATENT DOCUMENTS

WO    2017001998 A1    1/2017

OTHER PUBLICATIONS

E. Camacho-Galeano et al., "A 2-nW 1.1-V self-biased current reference in CMOS technology," IEEE Transactions on Circuits and Systems II: Express Briefs, vol. 52, No. 2, pp. 61-65, (Feb. 2005).

(Continued)

*Primary Examiner* — Diana J. Cheng
(74) *Attorney, Agent, or Firm* — Greer, Burns & Crain, Ltd.; Steven P. Fallon (57) ABSTRACT

An ultra-low-power voltage reference generator in an integrated CMOS circuit includes a regular MOS transistor reference current source connected to a line voltage and a regular MOS transistor resistor between the regular MOS transistor reference current source and ground. A constant with temperature reference voltage VREF is generated from a terminal inter-connecting the regular MOS transistor reference current source and the regular MOS transistor resistor. An ultra-low-power current reference generator receives a reference voltage and generated ultra-low level current from the reference voltage with a temperature compensated gate-leakage array.

15 Claims, 9 Drawing Sheets

FIG. 3D

(56) References Cited

U.S. PATENT DOCUMENTS 8,564,275 B2 * 10/2013 Seok .................. G05F 3/242
323/313
2012/0155168 A1 6/2012 Kim

OTHER PUBLICATIONS

T. Hirose et al., "A nano-ampere current reference circuit and its temperature dependence control by using temperature characteristics of carrier mobilities," in 2010 Proceedings of ESSCIRC, pp. 114-117 (Sep. 2010).

K. Ueno et al., "A 1-W 600-ppm/C Current Reference Circuit Consisting of Subthreshold CMOS Circuits," IEEE Transactions on Circuits and Systems II: Express Briefs, vol. 57, No. 9, pp. 681-685, (Sep. 2010).

[Z. Huang et al., "A CMOS Sub-1-V nanopower current and voltage reference with leakage compensation," in Proceedings of 2010 IEEE International Symposium on Circuits and Systems, pp. 4069-4072 (May 2010)].

C. Azcona et al., "Precision CMOS current reference with process and temperature compensation," in 2014 IEEE International Symposium on Circuits and Systems (ISCAS), pp. 910-913 (Jun. 2014).

J. Lee and S. Cho, "A 1.4-W 24.9-ppm/oC Current Reference with Process-Insensitive Temperature Compensation in 0.18-m CMOS," IEEE Journal of Solid-State Circuits, vol. 47, No. 10, pp. 2527-2533, (Oct. 2012).

Ji, Y. et al. A 9.3nW all-in-one bandgap voltage and current reference circuit, in 2017 IEEE International Solid-State Circuits Conference 100-101; doi: 10.1109/ISSCC 2017.7870280 (2017).

Y. Wang et al., "A 0.45-V, 14.6-nW CMOS Subthreshold Voltage Reference With No Resistors and No BJTs," IEEE Transactions on Circuits and Systems II: Express Briefs, vol. 62, No. 7, pp. 621-625, (Jul. 2015).

M. Seok et al., "A Portable 2-Transistor Picowatt Temperature-Compensated Voltage Reference Operating at 0.5 V," IEEE Journal of Solid-State Circuits, vol. 47, No. 10, pp. 2534-2545, (Oct. 2012).

Y.-S. Lin et al., "A sub-pW timer using gate leakage for ultra-low-power sub-Hz monitoring systems," in 2007 IEEE Custom Integrated Circuits Conference, pp. 397-400 (2007).

Y. Lee et al., "A 660pW multi-stage temperature-compensated timer for ultra-low-power wireless sensor node synchronization," in 2011 IEEE International Solid-State Circuits Conference, Feb. pp. 46-48 (2011).

Yu-Shiang Lin et al., "A 150pW program-and-hold timer for ultra-low power sensor platforms," in 2009 IEEE International Solid-State Circuits Conference—Digest of Technical Papers, Feb. pp. 326-327, 327 (2009).

P. M. Nadeau et al., "4.2 pW Timer for Heavily Duty-cycled Systems," in 2015 Symposium on VLSI Circuits, pp. 240-241 (2015).

H. Wang and P. P. Mercier, "A Reference-Free Capacitive-Discharging Oscillator Architecture Consuming 44.4 pW/75.6 nW at 2.8 Hz/6.4 kHz," IEEE Journal of Solid-State Circuits, vol. 51, No. 6, pp. 1-13, (2016).

A. Paidimarri et al., "A 120nW 18.5kHz RC oscillator with comparator offset cancellation for 0.25% temperature stability," in 2013 IEEE International Solid-State Circuits Conference Digest of Technical Papers, pp. 184-185 (Feb. 2013).

* cited by examiner

STABILIZED VOLTAGE AND CURRENT REFERENCE GENERATOR AND CIRCUITS

PRIORITY CLAIM AND REFERENCE TO RELATED APPLICATION

The application claims priority under 35 U.S.C. § 119 and all applicable statutes and treaties from prior U.S. provisional application Ser. No. 62/338,262, which was filed May 18, 2016.

FIELD

A field of the invention is low power circuits. Other fields of the invention include voltage reference generation and current reference generation. Example applications of the invention include circuits used in wireless systems, therapeutic devices, diagnostic devices, sensor devices, wearable devices, and research reagent applications.

BACKGROUND

Voltage reference generators are widely used to provide a stable voltage reference, which becomes difficult in ultra-low power (sub-nW<1000 pW) circuits. Current reference generators are utilized in nearly every type of analog circuit imaginable. They provide a stable current that is used to bias amplifiers and other analog circuits. Most current reference generators use bandgap structures, which cannot scale to ultralow supply voltages, and have power limits typically above 1 nW.

Advanced wireless platforms are especially dependent upon stable reference current generation circuits. In a typical wireless system, portions of or the entire system is powered by an energy storage device, e.g., a battery, which has limited energy and power density. The systems operate optimally at sub-1V levels, to conserve stored energy. In addition, techniques such as a "sleep" mode are used to conserve energy in systems that include near-zero power sensing nodes. Unfortunately, indispensable current reference circuits require a large portion of the sleep mode power budget of near-zero-power sensing nodes because they often operate with 100% duty cycle to bias watchdog timers and wake-up analog system elements. Conventional current reference generators also unfortunately place a large load on limited power resources in other systems, e.g., implantable biomedical systems, and environmental monitoring systems. A goal of such systems is to reduce power consumption boundaries to sub-nW levels, which is inhibited by conventional integrated current reference generator circuits that are suitable for such applications.

A common fully-integrated current reference is based on a β multiplier. See, e.g., E. Camacho-Galeano et al., "A 2-nW 1.1-V self-biased current reference in CMOS technology," IEEE Transactions on Circuits and Systems II: Express Briefs, vol. 52, no. 2, pp. 61-65, (February 2005), which uses self-cascode MOSFETs (SCMs). Another approach exploits the different temperature characteristics of different carrier mobility to achieve nW power consumption and compact design, which comes, however, at the price of a high temperature coefficient. T. Hirose et al., "A nano-ampere current reference circuit and its temperature dependence control by using temperature characteristics of carrier mobilities," in 2010 Proceedings of ESSCIRC, pp. 114-117 (September 2010). An improved temperature coefficient is obtained by employing a modified multiplier that uses a MOS resistor. See, K. Ueno et al., "A 1-W 600-ppm/C Current Reference Circuit Consisting of Subthreshold CMOS Circuits," IEEE Transactions on Circuits and Systems II: Express Briefs, vol. 57, no. 9, pp. 681-685, (September 2010). However, the power consumption in that approach is still on the order of μW. Temperature coefficients on the order of 100 ppm/° C. are achieved by employing leakage compensation [Z. Huang et al., "A CMOS Sub-1-V nanopower current and voltage reference with leakage compensation," in Proceedings of 2010 IEEE International Symposium on Circuits and Systems, pp. 4069-4072 (May 2010)] or by employing calibration [C. Azcona et al., "Precision CMOS current reference with process and temperature compensation," in 2014 IEEE International Symposium on Circuits and Systems (ISCAS), pp. 910-913 (June 2014)]. While leakage compensation and calibration can reduce power consumption to the desired nW level, typical circuits compensated in those ways can still exceed the power budget of near zero-power wireless platforms. In addition, the conventional current reference circuits require start-up circuits to prevent them from being trapped in the zero-bias condition, adding area and standby power overhead.

Another type of current reference circuit employs a reference voltage and a resistor. See, J. Lee and S. Cho, "A 1.4-W 24.9-ppm/° C. Current Reference with Process-Insensitive Temperature Compensation in 0.18-m CMOS," IEEE Journal of Solid-State Circuits, vol. 47, no. 10, pp. 2527-2533, (October 2012). This circuit was reported to achieve a temperature coefficient as low as 24.9 ppm/° C., but had high power consumption at the μW-level power. Another circuit that used a 2T (two transistor) voltage reference was reported to achieve pW power consumption, but at the expense of a significantly higher 780 ppm/° C. temperature sensitivity coefficient. Such prior conventional voltage reference based current generation circuits provide a trade-off between achieving either pW level power consumption or a suitable temperature coefficient.

Conventionally, temperature- and supply-stabilized voltages are generated via bandgap voltage reference generators (VRGs). However, the high required output voltage precludes very low power operation, as low-power CMOS circuits often work at sub-1 V levels. Additionally, most bandgap references require >1 nA, precluding their use for sub-nW systems. See, Ji, Y. et al. A 9.3 nW all-in-one bandgap voltage and current reference circuit. in 2017 IEEE International Solid-State Circuits Conference 100-101; doi: 10.1109/ISSCC.2017.7870280 (2017); Y. Wang et al., "A 0.45-V, 14.6-nW CMOS Subthreshold Voltage Reference With No Resistors and No BJTs," IEEE Transactions on Circuits and Systems II: Express Briefs, vol. 62, no. 7, pp. 621-625, (July 20150. Modification of such circuits with bandgap VRGs to achieve pA-level reference current would require resistors that are prohibitively large for a practical current generator.

Since bandgap VRGs are not suitable for sub nW applications, others have proposed 2T VRGs that consume pW-level power by exploiting the opposing temperature properties of native and high-Vth transistors. See, M. Seok et al., "A Portable 2-Transistor Picowatt Temperature-Compensated Voltage Reference Operating at 0.5 V," IEEE Journal of Solid-State Circuits, vol. 47, no. 10, pp. 2534-2545, (October 2012). However, not all CMOS technologies support native devices.

Many ultra-low power circuits and systems also require an oscillator for generating communication signals. Prior low-power oscillators have employed various strategies. One approach uses gate leakage transistors as current sources, i.e., the leakage current is itself used directly as a current source. See, Y.-S. Lin et al., "A sub-pW timer using gate leakage for ultra-low-power sub-Hz monitoring systems," in 2007 IEEE Custom Integrated Circuits Conference, pp. 397-400 (2007). A program-and-hold structure represents another approach. See, Yu-Shiang Lin et al., "A 150 pW program-and-hold timer for ultra-low power sensor platforms," in 2009 IEEE International Solid-State Circuits Conference-Digest of Technical Papers, February pp. 326-327, 327 (2009). Multistage structures with boosted capacitance charging provide another strategy. Y. Lee et al., "A 660 pW multi-stage temperature-compensated timer for ultra-low-power wireless sensor node synchronization," in 2011 IEEE International Solid-State Circuits Conference, February pp. 46-48 (2011). Another known approach is comparator-less structures based on program-and hold topologies. P. M. Nadeau et al., "4.2 pW Timer for Heavily Duty-cycled Systems," in 2015 Symposium on VLSI Circuits, pp. 240-241 (2015). Reference-free structures based on capacitive-discharging represent another strategy that has been used previously. H. Wang and P. P. Mercier, "A Reference-Free Capacitive-Discharging Oscillator Architecture Consuming 44.4 pW/75.6 nW at 2.8 Hz/6.4 kHz," IEEE Journal of Solid-State Circuits, vol. 51, no. 6, pp. 1-13, (2016). Another approach is a chopped relaxation oscillator topology. See, A. Paidimarri et al., "A 120 nW 18.5 kHz RC oscillator with comparator offset cancellation for 0.25% temperature stability," in 2013 IEEE International Solid-State Circuits Conference Digest of Technical Papers, pp. 184-185 (February 2013). While some of these strategies have demonstrated sub-nW fully-integrated solutions for Hz-range oscillation, most suffer from severe line dependence that is caused by the lack of line-regulated references. Paidimarri's approach does not suffer from line dependence, but consumes 120 nW and operates at 18.5 kHz.

SUMMARY OF THE INVENTION

A preferred embodiment provides an ultra-low-power voltage reference generator in an integrated CMOS circuit. The voltage regulator includes a regular MOS transistor reference current source connected to a line voltage and a regular MOS transistor resistor between the regular MOS transistor reference current source and ground. A constant with temperature reference voltage $V_{REF}$ is generated from a terminal inter-connecting the regular MOS transistor reference current source and the regular MOS transistor resistor A preferred embodiment provides an ultra-low-power current reference generator in an integrated CMOS circuit. The generator includes a self-biased amplifier acting as a buffer that receives a reference voltage from an ultra-low-power voltage reference generator, a temperature compensated gate-leakage array biased by the self-biased amplifier that provides a sufficient resistance to produce an ultra-low current in the picoAmp range that is proportional to the reference voltage from the voltage reference generator, and an output transistor outputting the ultra-low current. Preferably, the gate-leakage array includes pairs of standard-$V_T$ (SVT) and low-$V_T$ (LVT) PMOS transistors having opposite gate-leakage temperature coefficients connected in parallel.

A preferred oscillator includes first and second ultra-low-power switched paths providing a ramp voltage to a comparator input and a voltage reference to the other terminal, third and fourth paths with capacitance biased by a current reference and connected to the comparator terminals, a Schmitt Trigger connected to the output of the comparator, and output buffers from the Schmitt Trigger. The first and second paths receive a current reference generated with a preferred current reference generator, and the third and fourth paths receive a voltage reference generated with a preferred voltage reference generator.

A preferred method for generating a reference voltage in an integrated CMOS circuit includes generating a current reference with a first regular MOS transistor connect to a line voltage, providing resistance with a second regular MOS transistor connected to ground, and generating a constant with temperature reference voltage $V_{REF}$ from a terminal inter-connecting the regular MOS transistor reference current source and the regular MOS transistor resistor.

A preferred method for generating a reference current in an integrated CMOS circuit includes receiving a reference voltage via a buffer, and generating ultra-low level current from the reference voltage with a temperature compensated gate-leakage array.

DESCRIPTION OR THE PREFERRED EMBODIMENTS

Preferred embodiments provide ultra-low power voltage reference generators. The present ultra-low power voltage reference generators are fabricated with regular CMOS transistors, providing advantages compared to prior designs that require native transistors. Preferred embodiments include a push-pull configuration having a regular MOS transistor acting as a reference current source and a second regular MOS transistor acting as a resistor, with a constant with temperature reference voltage $V_{REF}$ being generated from the terminal inter-connecting the two MOS transistors. PMOS bodies used in the preferred embodiments are connected to their source terminals. The present ultra-low power reference generators can be staged, and preferred embodiments provide a first stage as a line regulator and a second stage as a fine voltage regulator.

Preferred embodiments provide ultra-low power current reference generators. The ultra-low power current reference generators obtain a voltage reference from an ultra-low power voltage reference generator, preferably in accordance with the voltage reference generators of the invention. A self-biased op-amp acts as a buffer for the voltage reference. An array of gate leakage transistors provides a large resistance that can convert the voltage reference into tens or less of picoAmp level current. Transistors are arrange to bias the buffer and to output the ultra-low current.

Preferred embodiments provide a current generator architecture that scales to low voltage (e.g. 0.5V) and ultra-low currents (preferably tens (10-30) and more preferably several picoAmps (a few to 10), e.g., 5 pA). Voltage from the stabilized voltage source is applied to a temperature-compensated gate-leakage transistor to generate a constant current.

Preferred embodiment current generator circuits simultaneously provide pW-level power consumption while supporting low temperature sensitivity. A preferred embodiment provides a gate-leakage-based current reference circuit including a self-biased amplifier that is used to bias an array of temperature compensated gate-leakage transistors with a reference voltage. To generate an on-chip reference voltage, a self-regulated push-pull voltage reference generator is provided by preferred embodiments. Simulation results indicate that the preferred current reference architecture sets new benchmarks in power and temperature stability.

Preferred embodiment circuits provide a temperature-stabilized current reference generator that can output ultra-low picoAmp level currents, e.g. as low as 5 pA with minimal power overhead. The output reference current is generated from a voltage reference with the resistance provided by a set of gate-leakage transistors designed to have opposing temperature coefficients. Low-power operation is achieved in preferred embodiment by generating the voltage reference via a two-stage, 4T (four transistor) push-pull structure that can operate at a low supply voltage, and driving this reference to the gate-leakage transistors via a low-voltage self-biased amplifier. An example embodiment is designed in a 65 nm CMOS process, and the preferred current reference generator is simulated to consume 14.5 pW at a 0.5 V supply voltage. Due to the push-pull structure and complementary gate-leakage transistors, the design achieves a temperature stability of 31 ppm/° C. from 0° C. to 100° C., and a line sensitivity of 0.94%/V averaged across 500 Monte Carlo samples, thereby enabling an ultra-low-power, area-efficient, and temperature- and supply stabilized current reference solution at pA-levels.

A preferred oscillator of the invention includes a supply-and-temperature-stabilized voltage and current reference generator (VCRG) that is configured to charge and reset a pair of swapping capacitors to create a chopped relaxation oscillator topology that consumes sub-nW power with comparable temperature stability to prior-art Hz-range oscillators, yet with >37.5× lower line sensitivity. Artisans will appreciate that the supply-and-temperature-stabilized voltage and current reference generator (VCRG) can be applied to any topology that requires a reference current and voltage.

Preferred embodiments of the invention will now be discussed with respect to experiments and resultant data. The applications and broader aspects of the invention will be understood by artisans in view of the general knowledge in the art and the description of the experiments that follows.

Figure 1:
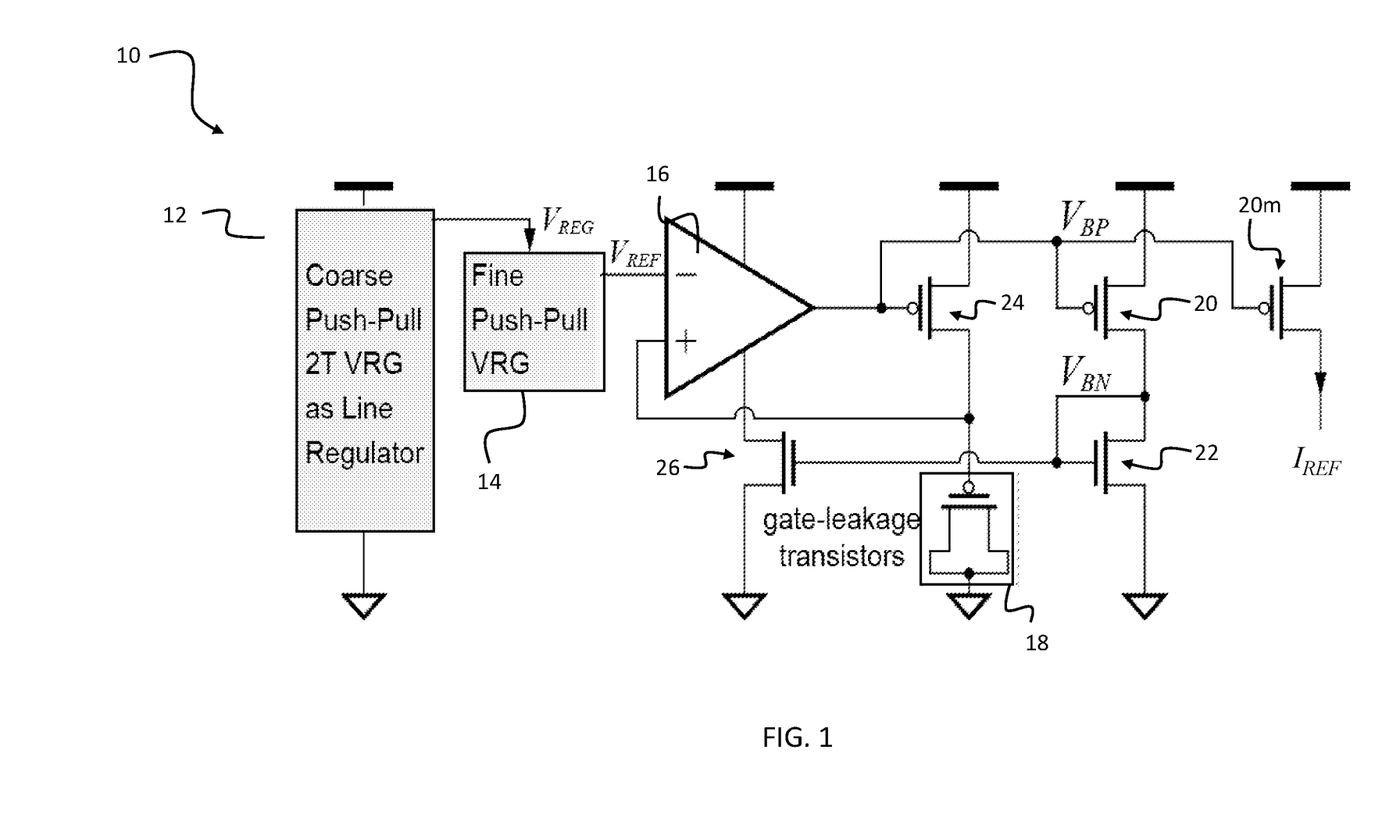
FIG. 1 is a schematic diagram of a preferred embodiment reference current generator.

FIG. 1 shows a preferred embodiment stabilized current generator 10. The generator 10 includes ultra-low-power (sub-nW, i.e. <1000 pW, and preferably as low as several picoWatts, i.e., <10 pW) push-pull voltage reference generators employed as respective coarse 12 (optional) and 14 accurate reference voltage generators (VRG). A self-biased amplifier 16 receives the accurate reference voltage and serves as a voltage buffer because the accurate VRG cannot be used to directly drive a resistive load, the reason being that a temperature-stable reference voltage requires the same drain current flowing through push-pull transistors used in the accurate VRG 14. A temperature-compensated gate-leakage array 18 is biased by the amplifier 16 and provides a large enough resistance to generate the ultra-low current from the voltage reference. The array 18 serves as large, yet compact resistance. In a specific example current generator consistent with FIG. 1, the coarse VRG is a 2T (2 transistor) push-pull that serves as a line regulator for a fine 2T push-pull VRG to obtain a temperature- and supply-stabilized 4T reference voltage. The ultra-low-power self-biased amplifier 16 is then used to bias a gate leakage array with the reference voltage, thereby resulting in a low-power, compact architecture with inherent temperature and supply-stability. Example experimental devices have demonstrated less than 13.8 pW across 0 to 100° C. A predetermined reference current IREF is generated. IREF flows through PMOS transistor 20 and A PMOS transistor 20m mirrors the current IREF and delivers it to a load. The amplifier 16 and PMOS 24 forms a unity gain buffer and biases the gate leakage array 18 at VREF. Therefore, a stabilized VREF ensures a stabilized IREF. Transistors 20, 22, and 26 are used to bias the amplifier.

Figure 2A:
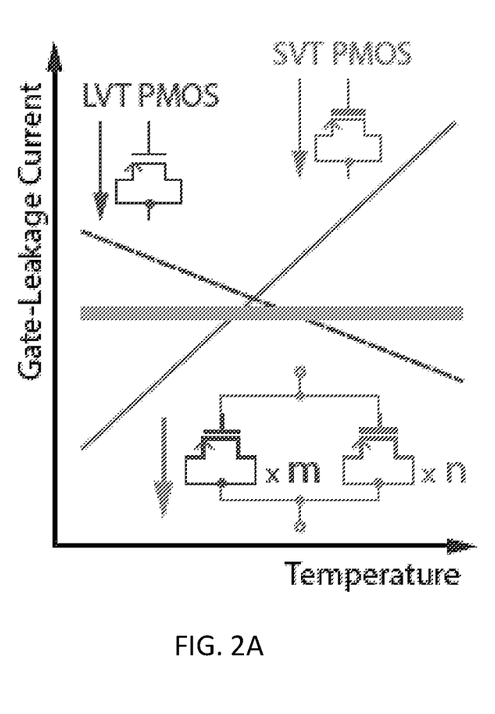
FIG. 2A compares gate leakage current as a function of temperature for different transistor arrangements and FIG. 2B plots leakage current versus temperature.
Figure 2B:
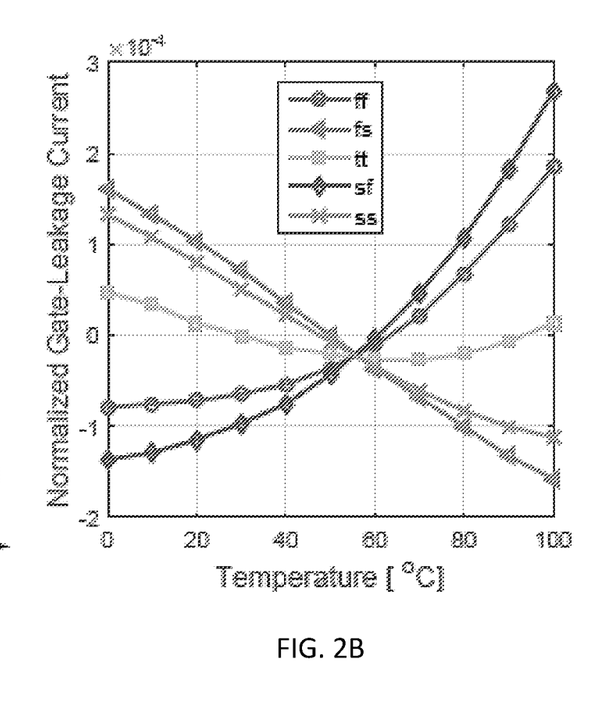
Figure 3A:
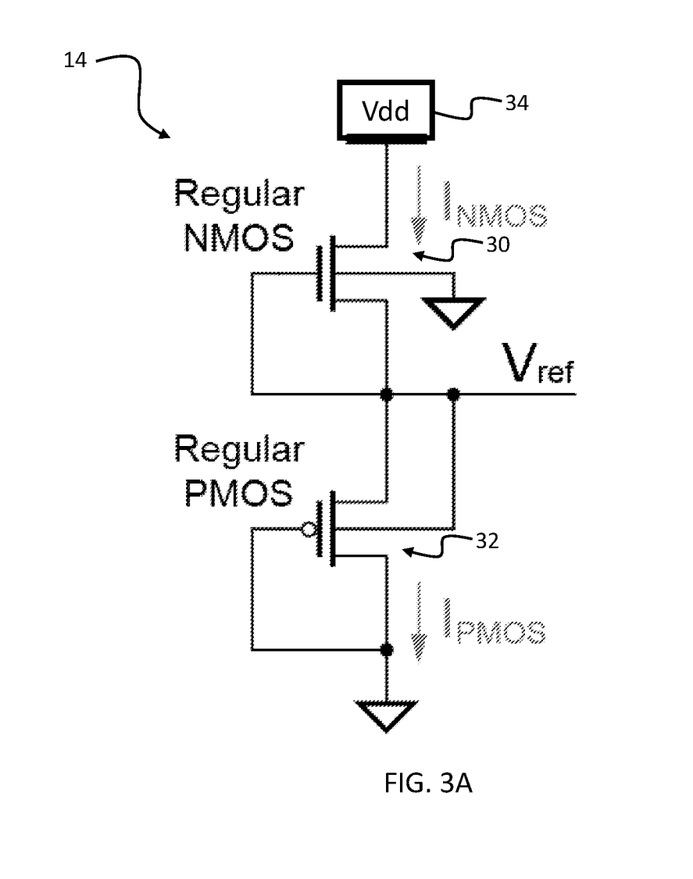
FIG. 3A shows a preferred embodiment ultra-low power push-pull voltage reference generator (VRG)
Figure 3B:
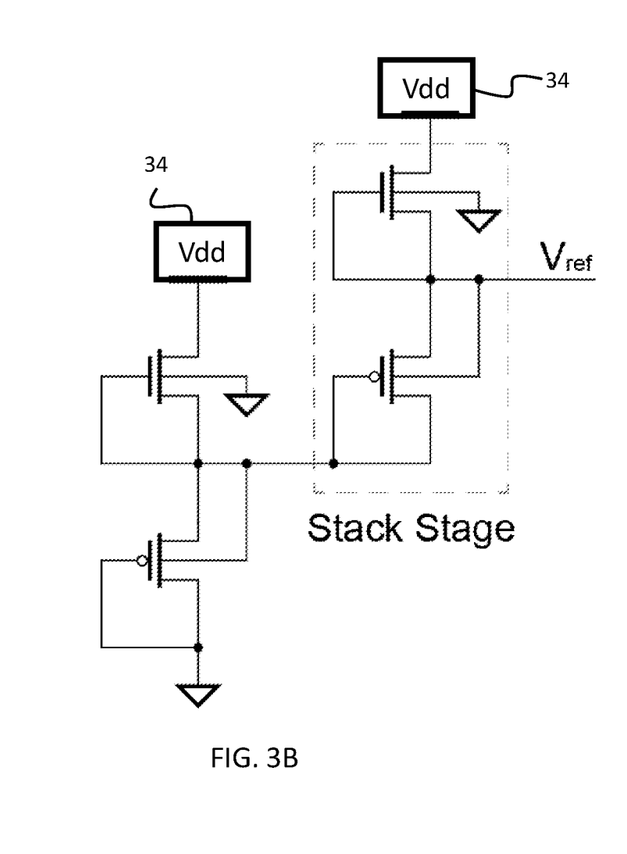
FIG. 3B illustrates a stacking of the VRG that is capable of generating plural different reference voltages.

With reference to FIG. 2A, preferred embodiments in the array 18 utilize standard-$V_T$ (SVT) and low-$V_T$ (LVT) PMOS transistors having opposite gate-leakage temperature coefficients in parallel (FIG. 2A inset), to thereby minimizing the temperature coefficient of the effective current core. When biased at a constant voltage, the simulated gate leakage, shown in FIG. 2B, exhibits a temperature coefficient of 0.7 ppm/° C. at TT corner while achieving a temperature coefficient better than 32 ppm/° C. across the different corners when operating at a temperature range from 0° C. to 100° C. Corners are used to describe the statistical distribution of the performance of the devices in fabrication. A TT corner indicates typical PMOS and typical NMOS, which has the highest possibility of occurrence, and can therefore be used to represent the performance with process variations FIG. 3A illustrates a preferred push-pull configuration for both the coarse and fine VRG 12 and 14 of FIG. 1. The 2T VRG core circuit includes and preferably consists of a regular NMOS transistor 30 and a regular PMOS transistor 32 arranged in a push-pull configuration, i.e., the NMOS transistor 30 is directly connected to a power supply 34 while the PMOS transistor 32 is placed between the NMOS transistor 30 and ground. A body of the regular PMOS transistor 32 is connected to its source instead of being connected to Vdd. The regular NMOS and PMOS transistors 30 and 32 are arranged in a push-pull configuration, and a reference voltage $V_{REF}$ is generated at the source of the regular PMOS transistor 32. As used herein, a regular transistor refers to transistors that are available from standard mask, without requiring extra mask in fabrication, i.e., non-native devices. FIG. 3B shows that stages can be added via stacking or cascading, which provides the capability of having multiple reference voltages. $V_{REF}$ is obtained from Equation (3) below. Simulation result shows that the present push-pull ultralow-power VRG achieves a temperature coefficient as low as 13.5 ppm/C across a temperature range from 0° C. to 100° C. with a power consumption of 1.3 pW.

Since the push-pull VRG can be implemented with regular transistors, it is used to show the capability of generating reference voltages at different levels. It can also be used to generate different reference currents. 1 Operating in the saturated subthreshold region, the drain currents flowing through the NMOS and PMOS transistors can be calculated by Equation 1 and Equation 2, respectively.

$$I_{NMOS} = \mu_1 C_{ox1} \frac{W_1}{L_1} (n_1 - 1)\phi_t^2 e^{\frac{o-V_{th1}}{n_1\phi_t}} \quad (1)$$

$$I_{PMOS} = \mu_2 C_{ox2} \frac{W_2}{L_2} (n_2 - 1)\phi_t^2 e^{\frac{V_{ref}-V_{th2}}{n_2\phi_t}} \quad (2)$$

$I_{NMOS} = I_{PMOS}$. All $\Phi$ has t as subscript, standing for thermal voltage. Therefore, $V_{ref}$ can be obtained by Equation 3.

$$V_{ref} = n_2 \phi_t \ln \frac{\mu_1 C_{ox1}(n_1 - 1)W_1 L_2}{\mu_2 C_{ox2}(n_2 - 1)W_2 L_1} + \frac{n_1 V_{th2} - n_2 V_{th1}}{n_1} \quad (3)$$

where $n_1$ and $n_2$ are the subthreshold slope factors of the NMOS and PMOS transistors, respectively, $\mu_1$ and $\mu_2$ are the mobility of the NMOS and PMOS transistor, respectively, $C_{ox1}$ and $C_{ox2}$ are the oxide capacitance of the NMOS and PMOS transistor, respectively, $W_1$ and $L_1$ are the width and length of the NMOS transistor, and $W_2$ and $L_2$ are the width and length of the PMOS transistor. The temperature coefficient of the generated reference voltage is provided by Equation 4.

$$\frac{\delta V_{ref}}{\delta T} = \frac{n_2 k}{q} \ln \frac{\mu_1 C_{ox1}(n_1 - 1)W_1 L_2}{\mu_2 C_{ox2}(n_2 - 1)W_2 L_1} + \frac{n_1 C_{Vth2} - n_2 C_{Vth1}}{n_1} \quad (4)$$

where $C_{Vth2}$ and $C_{Vth1}$ are the temperature coefficients of the threshold voltages of the NMOS and PMOS transistors, respectively. An optimal aspect ratio of the NMOS and PMOS transistors can be calculated by Equation 5, and a zero temperature coefficient is thereby obtained.

$$\frac{\delta V_{ref}}{\delta T} = 0 \Rightarrow \frac{\left(\frac{W_1}{L_1}\right)}{\left(\frac{W_2}{L_2}\right)} = \frac{\mu_2 C_{ox2}(n_2 - 1)}{\mu_1 C_{ox1}(n_1 - 1)} e^{\frac{q(n_2 C_{Vth1} - n_2 C_{Vth2})}{n_1 n_2 k}} \quad (5)$$

Simulation result shows that the preferred example push-pull ultralow-power VRG achieves a temperature coefficient as low as 13.5 ppm/° C. across a temperature range from 0° C. to 100° C. with a power consumption of 1.3 pW. Preferably, power consumption is less than 5.5 pW and preferred circuits provide power consumption as low as 1.3 pW or lower. Since the present push-pull VRG can be implemented with regular transistors, it provides a universal, ultra-low-power, low-cost, and scalable solution for reference voltage generation. It also provides a foundation for the preferred current generator of FIG. 1.

The preferred current reference generator of FIG. 1 is designed such that it can generate a reference current that is stable under the presence of supply variation, which is determined by the supply sensitivity of the voltage reference used to bias the current reference core. With scaling, a single transistor exhibits limited power supply rejection ability resulted from increased leakage between drain, source, and bulk as well as other short channel effects such as DIBL (drain induced barrier lowering). $I_{REF}$ is generated by biasing a gate-leakage array with $V_{REF}$. Therefore, in ideal operation $I_{REF}$ is only affected by VREF and the temperature dependence of the gate-leakage array.

Generally, the VRG of FIG. 3A is arranged a push-pull configuration having a regular MOS transistor (NMOS 30) acting as a reference current source and a second regular MOS (PMOS 32) acting as a resistor, with a constant with temperature reference voltage $V_{REF}$ being generated from the terminal inter-connecting the two MOS transistors. PMOS bodies used in the preferred embodiments are connected to their source terminals. In FIG. 3A, the gate of the NMOS transistor 30 is connected to its source and the source of the PMOS transistor 32, and the drain of the PMOS transistor 32 is connected to ground and its gate. FIGS. 3C-3I illustrate variations of the present ultra-low power VRG. All PMOS in FIGS. 3C-3I have bodies connected to their source terminals. In each of FIGS. 3C-3I, the regular MOS transistor acting as the current source is labelled with reference number 30 and the regular MOS transistor acting as a resistor is labelled with reference number 32, consistent with FIG. 3A. Each current source 30 is connected to the line voltage Vdd, though not shown, consistent with FIG. 3A. The labelling convention for FIGS. 3A and 3C-3I is shown in FIG. 3J. In particularly preferred embodiments, the VRGs consist solely of the features shown in FIG. 3A and FIGS. 3C-3I with no other circuit elements. In addition, the MOS 30 and 32 can be programmable MOS such that the size of 30 and 32 are tunable by switching to permit tuning and optimization of performance.

Figure 3C:
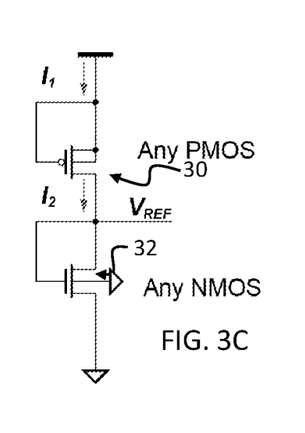
FIGS. 3C-3I illustrate variations of the present ultra-low power push-pull voltage reference generator.

In FIG. 3C, the gate of a regular PMOS transistor, acting as a reference current source 30, is connected to its source and the gate of a regular NMOS 32, acting as a resistor, is connected to its drain and the drain of the PMOS transistor, with the body of PMOS transistor connected to the source of the PMOS and the body of NMOS transistor to ground.

Figure 3D:
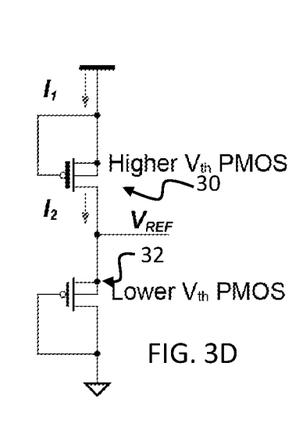

In FIG. 3D, the gate of a regular high Vth PMOS transistor 30 (higher threshold than the bottom PMOS 32), acting as a reference current source, is connected to the source of the higher Vth PMOS transistor and the gate of a low Vth PMOS transistor (lower threshold than the top PMOS 30), acting as a resistor, is connected to the drain of the low Vth PMOS transistor, with the body of high Vth PMOS transistor connected to the source of the high Vth PMOS and the body of low Vth PMOS transistor to the source of the low Vth PMOS transistor.

Figure 3E:
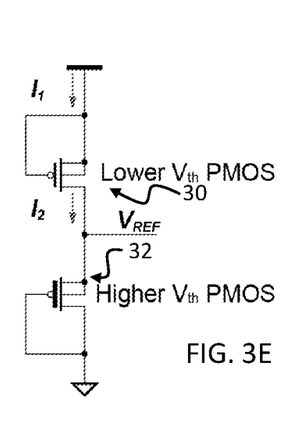

In FIG. 3E, the gate of a regular low Vth PMOS transistor, acting as a reference current source, is connected to the source of the low Vth PMOS transistor, acting as a resistor, and the gate of a high Vth PMOS transistor connected to the drain of the high Vth PMOS transistor, with the body of high Vth PMOS transistor connected to the source of the high Vth PMOS and the body of low Vth PMOS transistor to the source of the low Vth PMOS transistor.

Figure 3F:
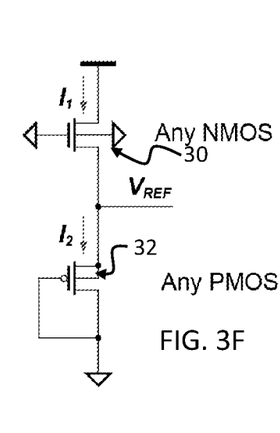

In FIG. 3F, the gate of a regular NMOS, acting as a reference current source, is connected to ground, the gate of a PMOS transistor, acting as a resistor, is connected to the drain of the PMOS transistor, and the source of the NMOS transistor is connected to the source of the PMOS transistor, with the body of PMOS transistor connected to the source of the PMOS and the body of NMOS transistor to ground.

Figure 3G:
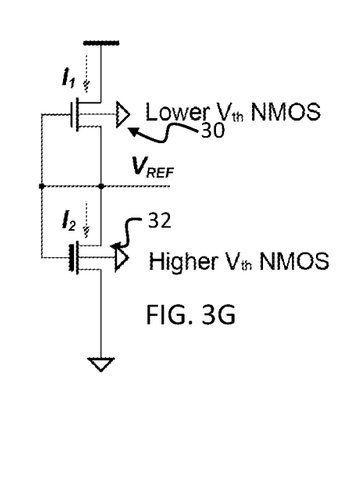

In FIG. 3G, the gate of a regular low Vth NMOS transistor, acting as a reference current source, is connected to the source of the low Vth NMOS transistor and the gate of a regular high Vth NMOS transistor, acting as a resistor, with the body of the low Vth NMOS transistor connected to ground and the body of the high Vth NMOS transistor to ground.

Figure 3H:
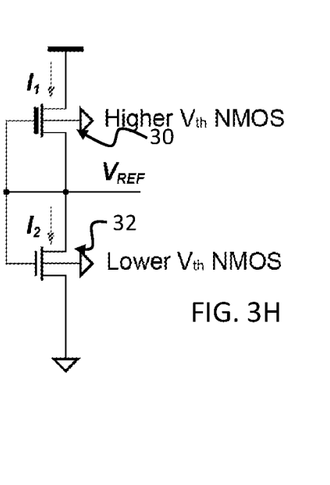

In FIG. 3H, the gate of a regular high Vth NMOS transistor, acting as a reference current source, is connected to the source of the high Vth NMOS transistor and the gate of a regular low Vth NMOS transistor, acting as a resistor, with the body of the low Vth NMOS transistor connected to ground and the body of the high Vth NMOS transistor to ground.

Figure 3I:
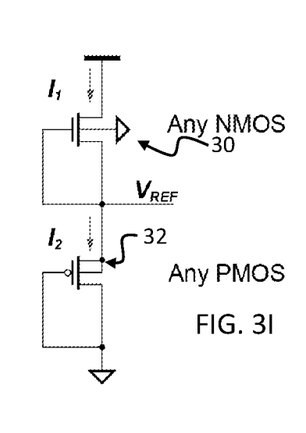
Figure 3J:
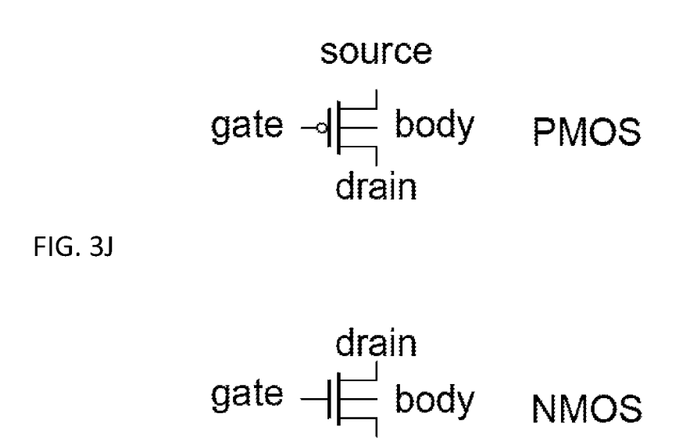
FIG. 3J shows the labelling convention for the NMOS and PMOS of FIGS. 3A and 3C-3I.

In FIG. 3I, the gate of a regular NMOS transistor, acting as a reference current source, is connected to the source of the NMOS transistor and the source of the a regular PMOS transistor, and the gate of the PMOS transistor, acting a resistor, is connected to the drain of the PMOS transistor, with the body of PMOS transistor connected to the source of the PMOS and the body of NMOS transistor to ground.

Figure 4A:
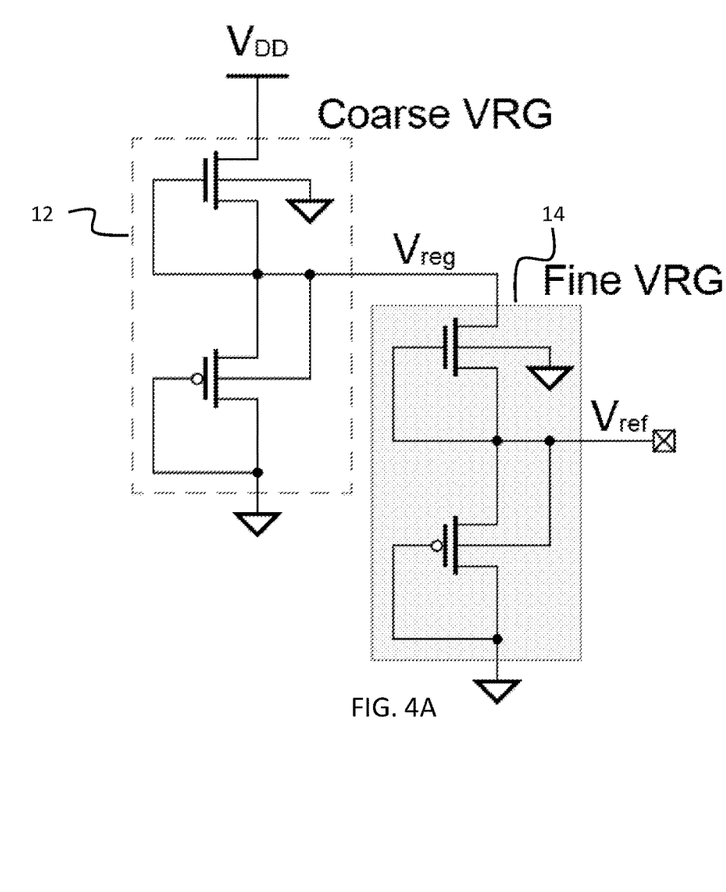
FIG. 4A illustrates a coarse push-pull VRG that serves as a line regulator for an accurate VRG of FIG. 3A in preferred embodiments.
Figure 4B:
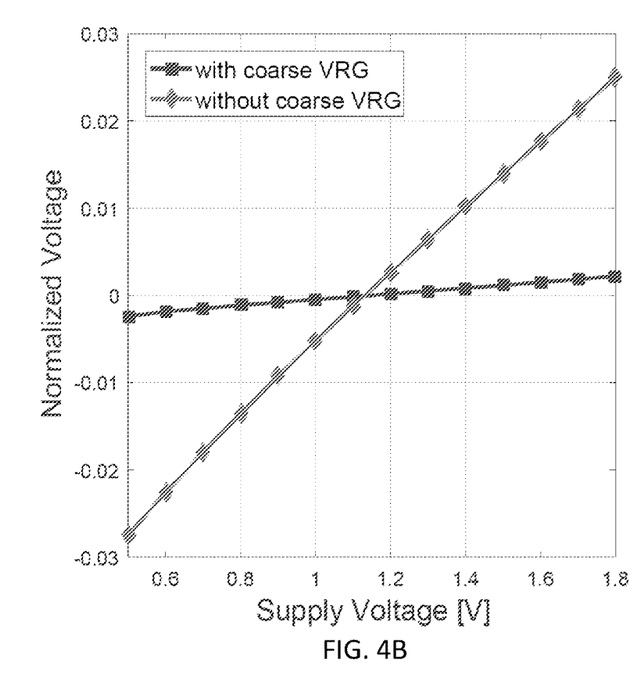
FIG. 4B shows simulated supply sensitivity to a reference voltage is reduced with the use of the line regulator.

FIG. 4A illustrates the preferred configuration of FIG. 1A, where the optional coarse voltage regulator 12 adds the second 2T push-pull VRG with relaxed accuracy. The VRG 12 serves as a line regulator for the downstream accurate push-pull VRG 14. Operating at a supply voltage range from 0.5 V to 1.8 V, simulation result shows that the 4T VRG achieves a line sensitivity of 0.35%/V, which is an 11× improvement over a single 2T VRG (which achieves 4%/V).

Figure 5A:
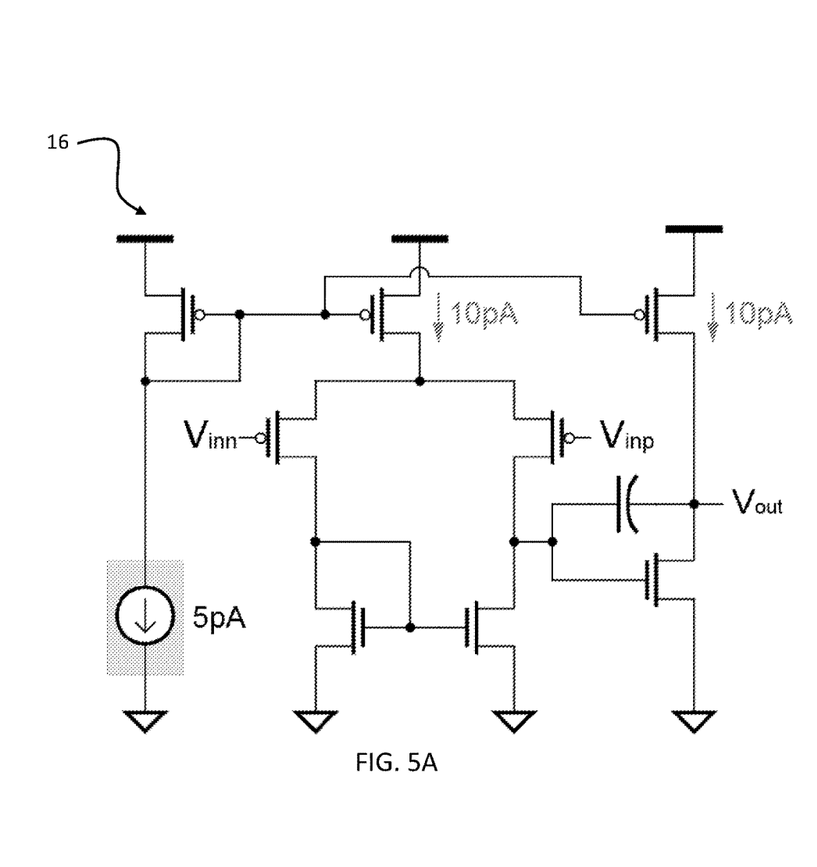
FIG. 5A shows a preferred self-biased amplifier for the FIG. 1 current generator.
Figure 5B:
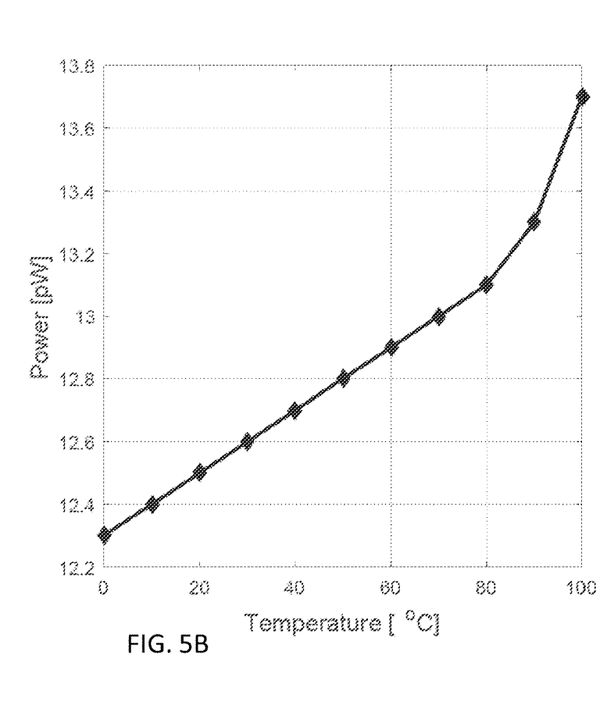
FIG. 5B shows simulated power consumption of the preferred self-biased amplifier as a function of temperature.

FIG. 5A shows an OP AMP circuit suitable for the self-biased amplifier 16 of FIG. 1, which is biased by $I_{REF}$, set at an example 5 pA. FIG. 5B shows simulated power consumption over a 0-100° C. range. The amplifier 16 biased with the reference current of 5 pA provides an ultra-low power consumption of 12.5 pW. In addition, since the generated reference current is temperature stabilized, the power consumption of the amplifier remains constant ("constant" means the variation is small (~100 ppm/° C.)) across the temperature range from 0 to 100° C. FIG. 5B indicate that the amplifier consumes 12.3 pW-13.7 pW across a temperature range of 0 to 100° C. The 2-stage self-biased amplifier is designed with a unity gain bandwidth of 1.3 kHz and a DC gain higher than 90 dB across the temperature range from 0 to 100° C., ensuring a voltage resolution higher than 32 ppm.

Simulations of the FIG. 1 current reference generator were implemented in a 65 nm CMOS process. The temperature-compensated gate leakage employed as the current reference core occupies an area of 176 μm², achieving a current of 5 pA biased at 180 mV which is generated by the self-regulated push-pull VRG of FIG. 3A. The simulation includes the coarse VRG and the accurate VRG, as represented in FIG. 4A.

Figure 6A:
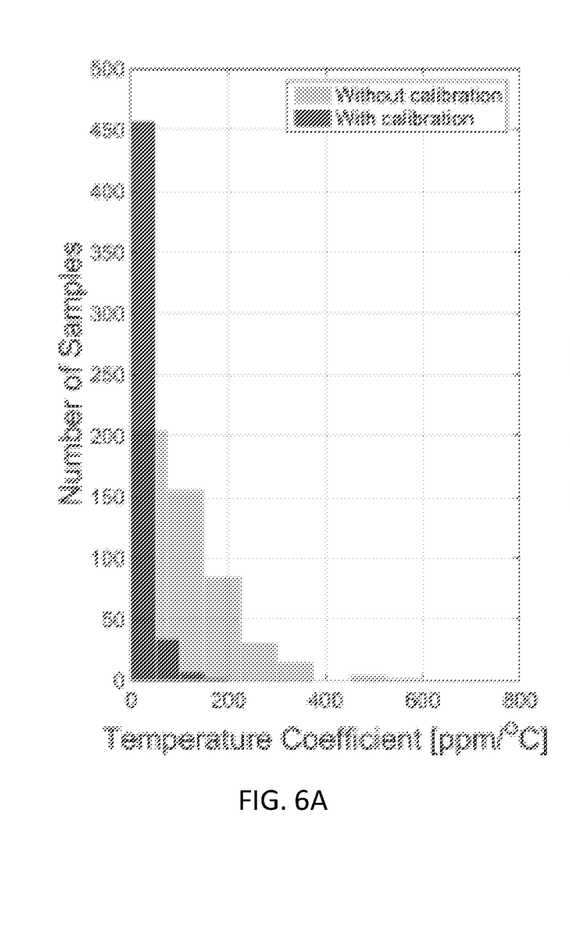
FIGS. 6A and 6B respectively show Monte Carlo simulation data for temperature coefficient and supply sensitivity with and without the preferred coarse VRG.
Figure 6B:
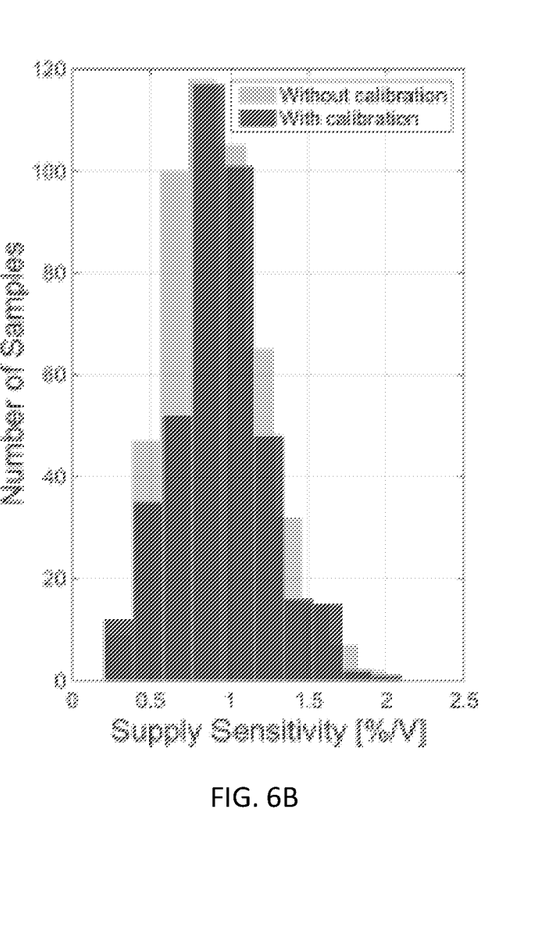

Operating from a 0.5 V supply, the current reference generator consumes 14.5 pW including all biasing and peripheral blocks. Monte Carlo simulations have been conducted to validate the statistical performance of the current reference generator and the results show that across the temperature range from 0 to 100° C., the present current reference generator, achieves an average temperature coefficient of 128 ppm/° C. with a standard deviation of 109 ppm/° C. for 50 samples. The Monte Carlo simulation results are shown in FIGS. 6A and 6B. The coarse VRG 12 improves the temperature coefficient by over 4× without affecting line sensitivity.

The average supply sensitivity is 0.95%/V with a standard deviation of 0.31%/V when operating at a supply voltage range from 0.5 V to 1.8 V without calibration as shown in FIG. 6B. Because the coarse VRG, which is serving as the line regulator, is not affected by the calibration process, the line sensitivity is thus not significantly affected by the calibration.

Compared to state-of-the art current generators, the present current generator provides comparable or better performance, while achieving a 5 pA current in a 65 nm process. The 5 pA current is 4 times smaller than the best known current to the inventors, which is provided as 20 pA in M. Choi et al., "A 23 pW, 780 ppm/C resistor-less current reference using subthreshold MOSFETs," in 2014 European Solid State Circuits Conference (ESSCIRC), September 2014, pp. 119-122. The power consumption is significantly lower than that work (14.5 pW compared to 23 pW), and the minimum supply voltage of 0.5V is also less than half of that work. Other state of the art work have currents in the nA to hundreds of nA range, and power consumption in the μW range.

Figures 7A, 7B:
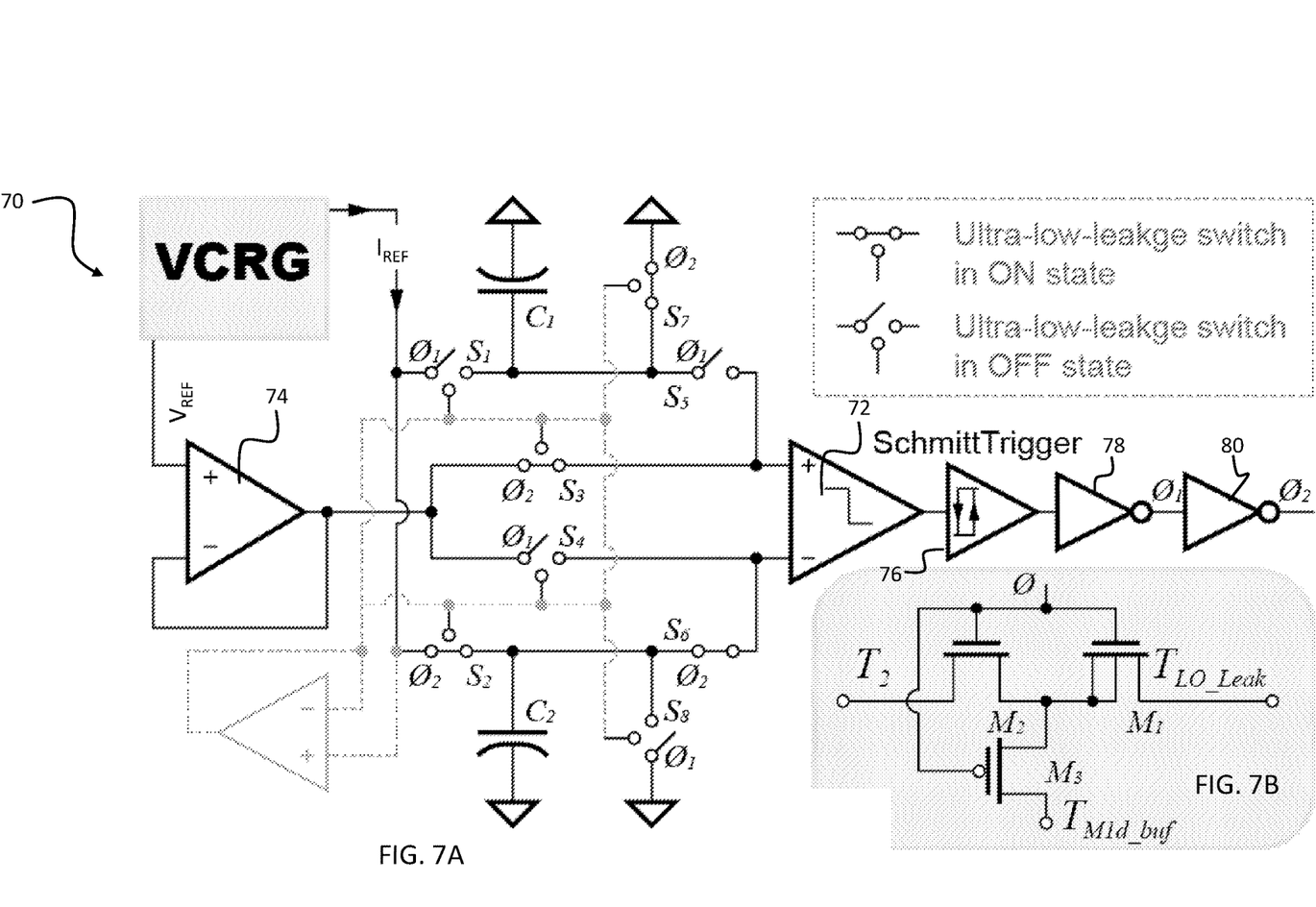
FIG. 7A is a schematic diagram of a preferred embodiment voltage and current regulated (VCRG) oscillator.
FIG. 7B is a schematic diagram of an ultra-low-leakage switch in the oscillator.

FIGS. 7A and 7B illustrate a preferred oscillator circuit 70 that includes a voltage and current reference generator (VRCG) in accordance with FIG. 1. In FIG. 7A, $I_{REF}$ (see FIG. 1) charges $C_1$ during $\phi_1$, generating a ramp voltage $V_{ramp}(t)=I_{REF}t/C_1$ at a positive input of a comparator 72. At the same time, $V_{REF}$ (see FIG. 1) is applied through a buffer 74 and the switch $S_4$ to the negative input of the comparator 72. When $V_{ramp}(t)$ reaches $V_{REF}$, the output of the two stage oscillator flips and enters the second phase $\phi_2$ of operation. In that phase, $I_{REF}$ charges C2, generating a ramp voltage $V_{ramp}(t)=I_{REF}t/C_2$ at the negative input of the comparator 72. At the same time. $V_{REF}$ is applied though the buffer 72 and switch S3 to the positive input of the comparator 72. The frequency of oscillation is provided by Equation 6:

$$T_{OSC} = \frac{V_{REF}C_1}{I_{REF}} + \frac{V_{REF}C_2}{I_{REF}} + t_{err}$$

where $t_{err}$ is the delay introduced by the comparator 72, and a following Schmitt trigger 76 and inverters 78, 80. A 50% duty cycle is achieved when $C_1=C_2=C_{charge}$ and the oscillation period is then defined by $$T_{OSC} = \frac{2V_{REF}C_{charge}}{I_{REF} + t_{err}}.$$

Because the ramp voltage is sequentially applied between $C_1$ and $C_2$, the offset of the comparator is chopped away to a first order. Since the absolute current flowing through the circuit is in the pA-range, the leakage of the switches can significantly impact the oscillation frequency. To minimize this effect, ultra-low-leakage switches are employed for all of the switches $S_1$ to $S_4$ in FIG. 7A. FIG. 7B illustrates a preferred ultra-low-leakage switch. In an "on" state of the switch ($\phi$ is high), the transistors $M_1$ and $M_2$ are turned on and terminals $T_2$ and $T_{LO\_LEAK}$ are electronically connected and transistor $M_3$ is turned off. When $\phi$ is low, $M_1$ and $M_2$ are turned off and $M_3$ is turned on, which is employed to bias the source of $M_1$ at a voltage of a replica of the drain voltage of $M_1$. This minimizes leakage current because the source, drain, and bulk terminals are biased at the same voltage.

An experimental oscillator of FIGS. 7A and 7B was fabricated in 65 nm CMOS, occupying a core area of 9100 μm². On-chip MIM capacitors $C_1$ and $C_2$ were size to be 2 pF each. Fourteen die samples from a single lot were tested.

$V_{REF}$ measurement. The reference voltage $V_{REF}$ was measured on average to be 147.1 mV (min/max=124.3/164.8 mV) when operating from 0.6 V at 20° C. From −40 to 120° C., the VRG achieved an average temperature coefficient of 364 ppm/° C. (min/max=162.7/726.8 ppm/° C.) at 0.6 V. $V_{REF}$ was measured to have nearly the same temperature coefficient at supply voltages up to 1.1 V. In a range from 0.6 to 1.1 V at 20° C., the average measured line regulation for 14 samples was 0.21%/V (min/max=0.06/0.45%/V).

$I_{REF}$ measurement. Across 14 samples, $I_{REF}$ was measured to be on average 10.2 pA (min/max=7.7/12.8 pA) at 0.6 V and 20° C. At 0.6 V, $I_{REF}$ achieved an average temperature coefficient of 1077.3 ppm/° C. (min/max=823.9/1316.8 ppm/° C.) from −40 to 120° C. The $I_{REF}T$ temperature coefficients also remained nearly constant at supplies up to 1.1 V. The measured line regulation at 20° C. was 1.79%/V (min/max=0.66/3.33%/V).

VCRG power consumption. The power consumption was measured to be 49.7 pW on average across 14 samples at 0.6 V and 20° C.

Oscillator measurements. The experimental oscillator achieved an average oscillation frequency of 9.3 Hz (min/max=6.2/12.8 Hz) when operating at 0.6 V at 20° C. The oscillator achieved an average temperature coefficient of 999.9 ppm/° C. (min/max=217.6/1685.6 ppm/° C.) when operating at 0.6 V, without any calibration or trimming. When operating between 0.6 to 1.1 V, the oscillator achieved an average line regulation of 1.6%/V (min/max=0.6/3.8%/V), which improves over state-of the-art oscillators discussed in the background by at least 37.5×, noting that the prior best metric [Yu-Shiang Lin et al., "A 150 pW program-and-hold timer for ultra-low power sensor platforms," in 2009 IEEE International Solid-State Circuits Conference—Digest of Technical Papers, February pp. 326-327, 327 (2009)] only operated over a 100 mV supply range, and only measured a single die. The die with the best sensitivity in this experimental oscillators of the invention was measured to achieve a 50× higher supply stability than Yu-Shiang Lin et al The experimental oscillator of the invention achieved an Allan deviation floor <220 ppm, which also exceeds state-of-the-art Hz-range oscillators, thereby indicating its long-term stability. Over 14 samples, the average power consumption of the overall system was measured to be 124.2 pW (min/max=34/281.6 pW) at 20° C. and 0.6 V.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. An ultra-low-power voltage reference generator in an integrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein the single regular MOS transistor reference current source and the single regular MOS transistor resistor have opposite temperature coefficients such that a constant with temperature reference voltage VREF is generated from a terminal inter-connecting the regular MOS transistor reference current source and body and source of the regular PMOS transistor resistor.

2. The reference voltage reference generator according to claim 1, wherein threshold voltages of the single regular MOS transistor reference current source and the single regular MOS transistor resistor are different.

3. The reference voltage reference generator according to claim 1 arranged as a first regulator stage, and further comprising a second stage voltage reference generator stacked or cascaded with the first stage, wherein a final VREF is provided by the second stage.

4. An ultra-low-power voltage reference generator in an integrated CMOS circuit comprising a regular MOS transistor reference current source connected to a line voltage and a regular MOS transistor resistor between the regular MOS transistor reference current source and ground, wherein a constant with temperature reference voltage VREF is generated from a terminal inter-connecting the regular MOS transistor reference current source and the regular MOS transistor resistor, wherein the body of either the regular MOS transistor reference current source or the regular MOS transistor resistor is connected to its respective source, wherein the regular MOS transistor reference current source is a PMOS transistor and the regular MOS transistor resistor is an NMOS transistor, wherein a gate of the PMOS transistor is connected to its source and its drain is connected to the drain of the NMOS transistor, and source of the NMOS transistor is connected to ground.

5. The reference voltage reference generator according to claim 4, wherein a body of the NMOS transistor is connected to ground and a body of the PMOS transistor is connected to its source.

6. An ultra-low-power voltage reference generator in an integrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein a constant with temperature reference voltage VREF is generated from a terminal inter-connecting the regular MOS transistor reference current source and body and source of the regular PMOS transistor resistor, wherein the regular MOS transistor reference current source is a higher threshold PMOS transistor and the regular MOS transistor resistor is lower threshold PMOS transistor, wherein a gate of the higher threshold PMOS transistor is connected to its source and its drain is connected to the source of the lower threshold PMOS transistor, and the drain of the lower threshold PMOS transistor is connected to ground.

7. The reference voltage reference generator according to claim 6, wherein bodies of both of the higher and lower threshold PMOS transistors are connected to their sources.

8. An ultra-low-power voltage reference generator in an integrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein a constant with temperature reference voltage VREF is generated from a terminal inter-connecting the regular MOS transistor reference current source and body and source of the regular PMOS transistor resistor, wherein the regular MOS transistor reference current source is a lower threshold PMOS transistor and the regular MOS transistor resistor is higher threshold PMOS transistor, wherein a gate of the lower threshold PMOS transistor is connected to its source and its drain is connected to the source of the higher threshold PMOS transistor, and the drain of the higher threshold PMOS transistor is connected to ground.

9. The reference voltage reference generator according to claim 8, wherein bodies of both of the higher and lower threshold PMOS transistors are connected to their sources.

10. An ultra-low-power voltage reference generator in an integrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein a constant with temperature reference voltage VREF is generated from a terminal inter-connecting the regular MOS transistor reference current source and body and source of the regular PMOS transistor resistor, wherein the regular MOS transistor reference current source is a NMOS transistor and the regular MOS transistor resistor is a PMOS transistor, wherein a gate of the NMOS transistor is connected to ground and its source is connected to the source of the PMOS transistor, and the drain of the PMOS transistor is connected to ground.

11. The reference voltage reference generator according to claim 10, wherein the body of the NMOS transistor is connected to ground.

12. An ultra-low-power voltage reference generator in an intergrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein a constant with temperature reference voltage VREF is generated from a terminal inter-connecting the regular MOS transistor reference current source and body and source of the regular PMOS transistor resistor, wherein a threshold voltages of the single regular MOS transistor reference current source and the single regular MOS transistor resistor are different, wherein the regular MOS transistor reference current source is a NMOS transistor and the regular MOS transistor resistor is a PMOS transistor, wherein a gate of the NMOS transistor is connected to its source and the source of the PMOS transistor, and the drain of the PMOS transistor is connected to ground and its gate.

13. The reference voltage reference generator according to claim 12, wherein the body of the NMOS transistor is connected to ground.

14. An ultra-low-power voltage reference generator in an intergrated CMOS circuit consisting of a single regular MOS transistor reference current source connected to a line voltage and a single regular MOS transistor resistor between the regular MOS transistor reference current source and ground, at least one of the single regular MOS transistor reference current source and the single regular MOS transistor resistor being a regular PMOS transistor with a body of the regular PMOS transistor being connected to a source of the regular PMOS transistor, wherein a constant with temperature reference voltage VREF is generated from a terminal inter-connecting the regular MOS transistor reference current source and body and source of the regular PMOS transistor resistor, wherein the regular MOS transistor reference current source is a NMOS transistor and the regular MOS transistor resistor is a PMOS transistor, wherein a gate of the NMOS transistor is connected to its source and the source of the PMOS transistor, and the drain of the PMOS transistor is connected to ground and its gate.

15. The reference voltage reference generator according to claim 14, wherein the body of the NMOS transistor is connected to ground.

* * * * *